United States Patent
Hung

(10) Patent No.: US 9,207,114 B2
(45) Date of Patent: Dec. 8, 2015

(54) PHOTOELECTRIC CONVERSION DEVICE

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 240 days.

(21) Appl. No.: 13/904,168

(22) Filed: May 29, 2013

(65) Prior Publication Data

US 2014/0151585 A1   Jun. 5, 2014

(30) Foreign Application Priority Data

Dec. 3, 2012 (TW) .............................. 101145345 A

(51) Int. Cl.
*G01J 1/04* (2006.01)
*G01J 1/02* (2006.01)

(52) U.S. Cl.
CPC ............ *G01J 1/0411* (2013.01); *G01J 1/0204* (2013.01); *G01J 1/0266* (2013.01); *G01J 1/0407* (2013.01); *G01J 1/0451* (2013.01)

(58) Field of Classification Search
CPC ..... G01J 1/0411; G01J 1/0407; G01J 1/0451; G01J 1/0204; G01J 1/0266; G01J 1/0242; G01J 1/0228; G01J 1/4228; G01J 1/0271; G01J 1/0477; G01J 1/02; G01J 3/42; G01J 2001/4252; G01J 1/4257; G01J 2001/4247; G01J 1/42; G01J 3/0205; G01J 1/04; G02B 6/4214

See application file for complete search history.

(56) References Cited

U.S. PATENT DOCUMENTS

| | | | | | |
|---|---|---|---|---|---|
| 4,260,883 | A | * | 4/1981 | Onoda et al. | 250/226 |
| 5,190,042 | A | * | 3/1993 | Hock | 600/405 |
| 5,781,305 | A | * | 7/1998 | Downes | 356/435 |
| 6,522,443 | B1 | * | 2/2003 | Shahar et al. | 359/212.2 |
| 7,598,527 | B2 | * | 10/2009 | Behfar et al. | 257/85 |
| 8,837,881 | B2 | * | 9/2014 | Hung | 385/33 |
| 8,901,478 | B2 | * | 12/2014 | Hung | 250/227.11 |
| 8,923,671 | B2 | * | 12/2014 | Hung | 385/36 |
| 8,939,657 | B2 | * | 1/2015 | Hung | 385/89 |
| 8,942,524 | B2 | * | 1/2015 | Hung | 385/33 |
| 8,976,346 | B2 | * | 3/2015 | Hung | 356/218 |
| 9,000,377 | B2 | * | 4/2015 | Rossi et al. | 250/341.8 |
| 9,006,643 | B2 | * | 4/2015 | Lin | 250/227.24 |
| 2002/0150340 | A1 | * | 10/2002 | Ikeda et al. | 385/39 |
| 2004/0165828 | A1 | * | 8/2004 | Capewell et al. | 385/47 |
| 2006/0209379 | A1 | * | 9/2006 | Guscho | 359/245 |
| 2012/0069336 | A1 | * | 3/2012 | Rakitzis | 356/369 |
| 2013/0330230 | A1 | * | 12/2013 | Uri et al. | 422/69 |
| 2014/0145070 | A1 | * | 5/2014 | Hung | 250/216 |

(Continued)

*Primary Examiner* — John Lee
(74) *Attorney, Agent, or Firm* — Novak Druce Connolly Bove + Quigg LLP

(57) ABSTRACT

A photoelectric conversion device includes a circuit board, a first light emitting module, a first light receiving module, a second light emitting module, a second light receiving module, and an optical coupling member. The light emitting modules and the light receiving modules are mounted on the circuit board. The optical coupling member includes a first reflective surface obliquely connected to the light incident surface, four converging lenses, a second reflective surface, and a third reflective surface. The converging lenses are formed on the light incident surface. The first reflective surface defines a recess for receiving the second and third reflective surfaces. The third converging lens is fed by the second reflective surface and the fourth converging lens is fed by the third reflective surface.

8 Claims, 4 Drawing Sheets

(56) References Cited

U.S. PATENT DOCUMENTS

| | | |
|---|---|---|
| 2014/0151585 A1* | 6/2014 | Hung .......................... 250/578.1 |
| 2014/0175268 A1* | 6/2014 | Hung ....................... 250/227.11 |
| 2014/0178002 A1* | 6/2014 | Hung .............................. 385/33 |
| 2014/0294354 A1* | 10/2014 | Hung .............................. 385/93 |
| 2014/0312214 A1* | 10/2014 | Hung ....................... 250/227.11 |
| 2014/0314426 A1* | 10/2014 | Wang He et al. ............. 398/156 |
| 2015/0002839 A1* | 1/2015 | Hung ............................ 356/124 |
| 2015/0049985 A1* | 2/2015 | Hung .............................. 385/33 |
| 2015/0062565 A1* | 3/2015 | Hung ............................ 356/124 |
| 2015/0063749 A1* | 3/2015 | Hung .............................. 385/33 |

\* cited by examiner

PHOTOELECTRIC CONVERSION DEVICE

BACKGROUND

1. Technical Field

The present disclosure relates to photoelectric conversion devices.

2. Description of Related Art

A photoelectric conversion device includes a circuit board, a light emitting module, a light receiving module, and an optical coupling member. The light emitting module and the light receiving module are mounted on the circuit board. The optical coupling member includes a first converging lens and a second converging lens. The first converging lens is to be aligned with and optically coupled with the light emitting module, and the second converging lens is to be aligned with and optically coupled with the light receiving module. Light emitted from the light emitting module passes through the first converging lens, and light from the second converging lens reaches the light receiving module. The transmission efficiency of light depends on the alignment precision between the first converging lens and the light emitting module and between the second converging lens and the light receiving module. In particular, the higher the precision, the higher is the transmission efficiency. Therefore, it is important to design a photoelectric conversion device having precise alignment between the first converging lens and the light emitting module and between the second converging lens and the light receiving module.

DETAILED DESCRIPTION

Figure 1:
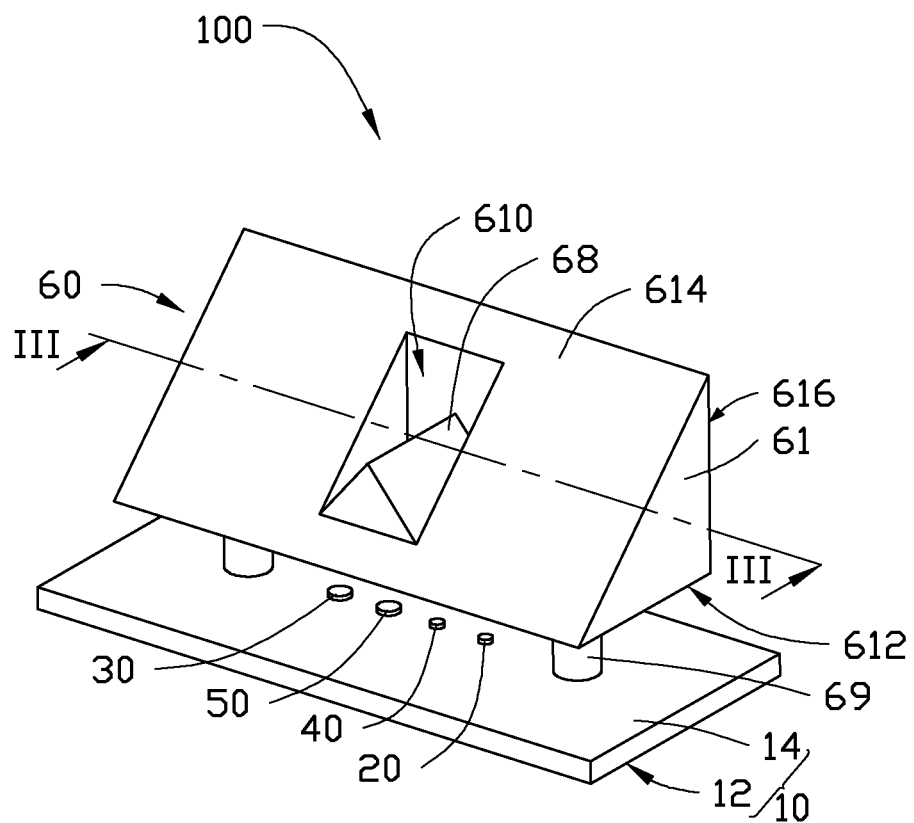
FIG. 1 is a schematic, isometric view of a photoelectric conversion device, according to an exemplary embodiment.

Referring to FIG. 1, a photoelectric conversion device 100, according to an exemplary embodiment, includes a circuit board 10, a first light emitting module 20, a first light receiving module 30, a second light emitting module 40, a second light receiving module 50, and an optical coupling member 60.

The circuit board 10 includes a lower surface 12 and an upper surface 14. The lower surface 12 and the upper surface 14 are positioned at opposite sides of the circuit board 10, and the lower surface 12 is parallel to the upper surface 14.

The first light emitting module 20, the first light receiving module 30, the second light emitting module 40, and the second light receiving module 50 are mounted on the upper surface 14 and electrically connected to the circuit board 10. In detail, the first light emitting module 20, the second light emitting module 40, the second light receiving module 50, and the first light receiving module 30 are arranged in one line, and the second light emitting module 40, the second light receiving module 50 are located between the first light emitting module 20 and the first light receiving module 30. That is, centers of the first light emitting module 20, of the second light emitting module 40, of the second light receiving module 50, and of the first light receiving module 30 are arranged in one line. In this embodiment, the first light emitting module 20 and the second light emitting module 30 are vertical cavity surface emitting laser (VCSEL) diodes and are configured for emitting light. The first light receiving module 40 and the second light receiving module 50 are photo diodes and are configured for receiving light.

Figure 2:
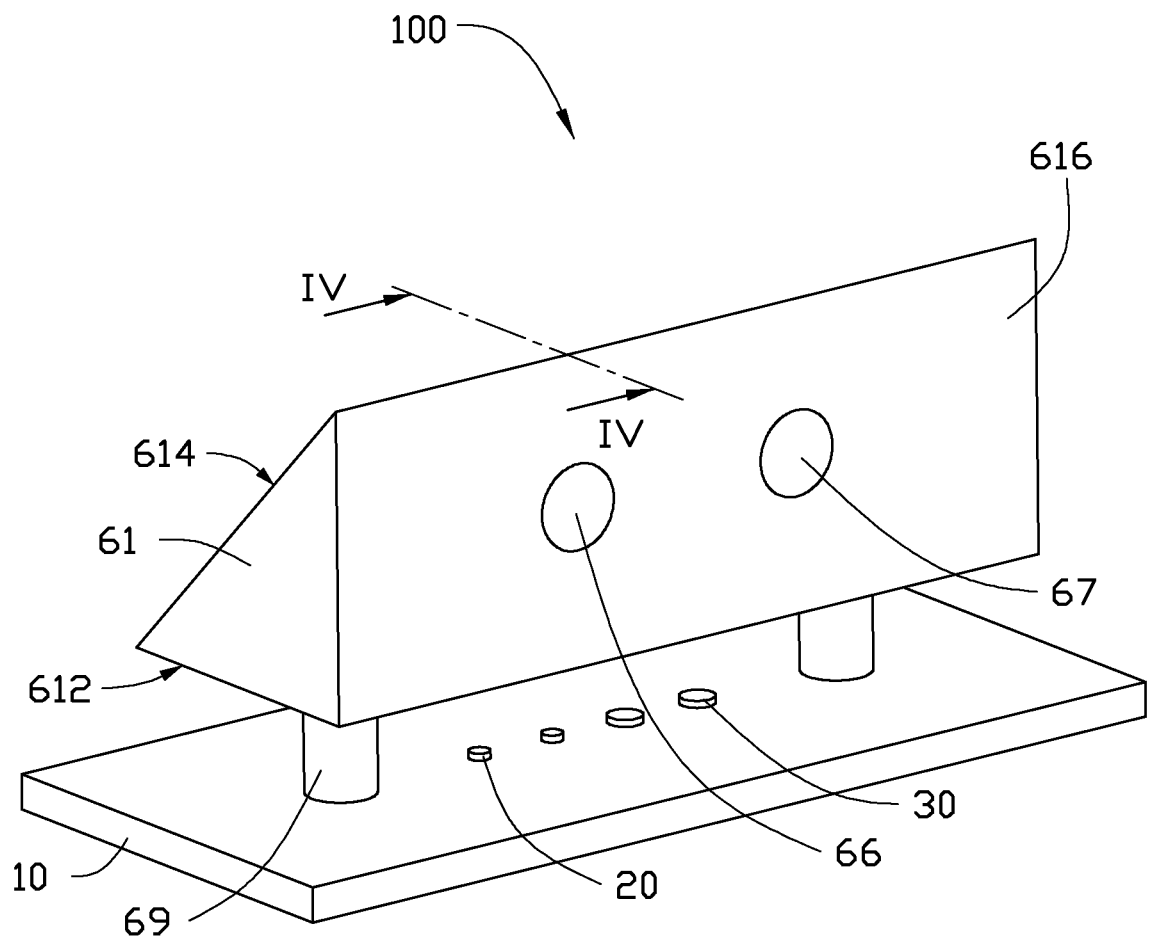
FIG. 2 is similar to FIG. 1, but viewed from another aspect.
Figure 3:
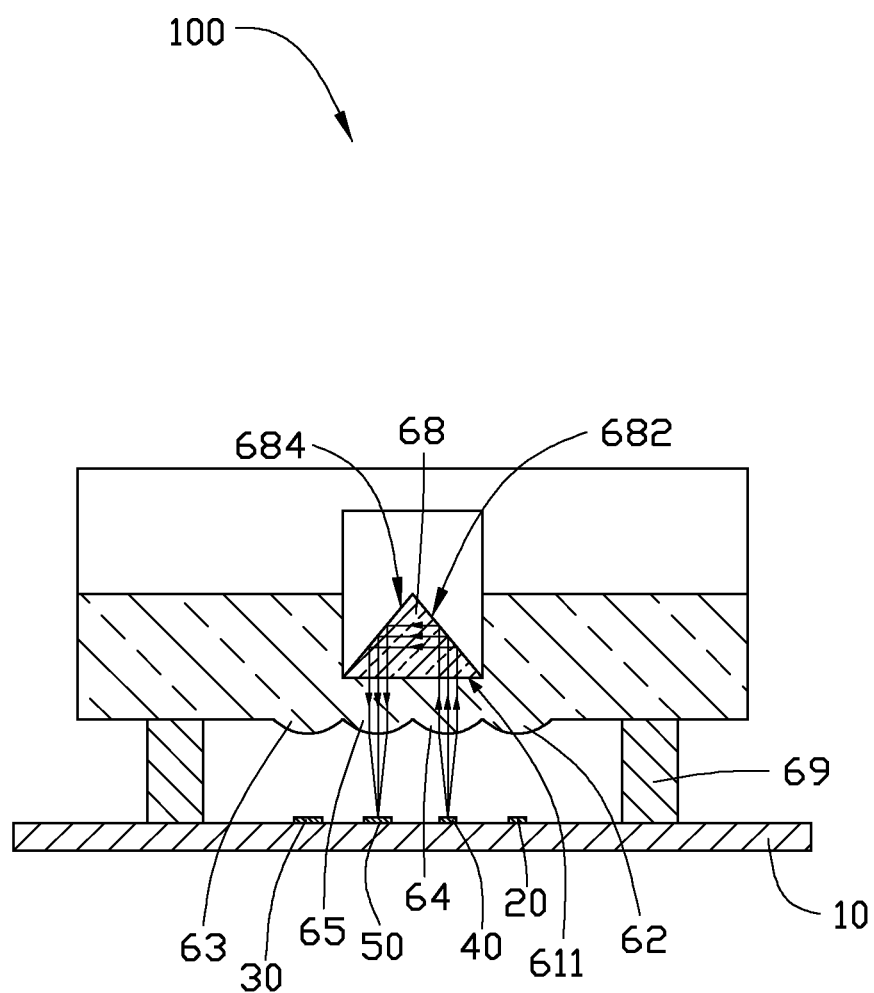
FIG. 3 is a sectional view of the photoelectric conversion device of FIG. 1, taken along the line III-III of FIG. 1.

Referring to FIGS. 2-3, the optical coupling member 60 includes a body portion 61, a first converging lens 62, a second converging lens 63, a third converging lens 64, a fourth converging lens 65, a fifth converging lens 66, a sixth converging lens 67, a reflection portion 68, and two supports 69.

The body portion 61 is a straight triangular prism and includes a light incident surface 612, a first reflection surface 614, and a light output surface 616. The light incident surface 612 is parallel to the upper surface 14 of the circuit board 10. The light output surface 616 perpendicularly extends from the light incident surface 612. The first reflection surface 614 is obliquely interconnected between the light incident surface 612 and the light output surface 616. In this embodiment, an included angle between the light incident surface 612 and the first reflection surface 614 is about 45 degrees, and an included angle between the light output surface 616 and the first reflection surface 614 is about 45 degrees. A recess 610 is defined in the first reflection surface 614. The recess 610 includes a bottom surface 611 parallel to the light incident surface 612 and the upper surface 14.

The first converging lens 62, the third converging lens 64, the fourth converging lens 65, and the second converging lens 63 are formed on the light incident surface 612 and arranged apart from each other. The first converging lens 62, the third converging lens 64, the fourth converging lens 65, and the second converging lens 63 correspond to the first light emitting module 20, the second light emitting module 40, the second light receiving module 50, and the first light receiving module 30 respectively. The fifth converging lens 66 and the sixth converging lens 67 are formed on the light output surface 616 and arranged apart from each other.

The reflection portion 68, which has substantially the same shape as the optical coupling member 60 but in miniature, is positioned in the recess 610 and extends from the bottom surface 611. The reflection portion 68 includes a second reflection surface 682 and a third reflection surface 684. The second reflection surface 682 and the third reflection surface 684 are oblique in relation to the bottom surface 611, and the second reflection 682 is perpendicularly connected to the third reflection surface 684. In detail, an included angle between the second reflection surface 682 and the bottom surface 611 is about 45 degrees, and an included angle between the third reflection surface 684 and the bottom surface 611 is about 45 degrees.

The two supports 69 perpendicularly extend from the light incident surface 612 and are arranged apart from each other. In this embodiment, the first converging lens 62, the third converging lens 64, the fourth converging lens 65, the second converging lens 63, and the two supports 69 are arranged in one line, and the first converging lens 62, the third converging lens 64, the fourth converging lens 65, the second converging lens 63 are located between the two supports 69.

The locational relationship between the first converging lens 62 and the third converging lens 64 is substantially the same as that between the first light emitting module 20 and the second light emitting module 40. The locational relationship between the first converging lens 62 and the fourth converging lens 65 is substantially the same as that between the first light emitting module 20 and the second light receiving module 50. The locational relationship between the second converging lens 63 and the third converging lens 64 is substantially the same as that between the first light receiving module 30 and the second light emitting module 30. The locational relationship between the second converging lens 63 and the fourth converging lens 65 is substantially the same as that between the first light receiving module 30 and the second light receiving module 50.

In this embodiment, the body portion 61, the first converging lens 62, the second converging les 63, the third converging lens 64, the fourth converging lens 65, the fifth converging lens 66, and the sixth converging lens 67 are formed as a unitary piece. The body portion 61, the reflection portion 68, and the two supports 69 are separately formed. In alternative embodiments, the body portion 61, the first converging lens 62, the second converging lens 63, the third converging lens 64, the fourth converging lens 65, the fifth converging lens 66, and the sixth converging lens 67 may be separately formed, and the body portion 61, the reflection portion 68, and the two supports 69 are formed as a unitary piece.

When the photoelectric conversion device 100 is assembled, the optical coupling member 60 is adhered on the upper surface 14 with adhesive. In detail, first, the optical coupling member 60 is placed on the upper surface 14. In this situation, the two supports 69 abut the upper surface 14, and the first converging lens 62, the third converging lens 64, the fourth converging lens 65, and the second converging lens 63 are roughly aligned with the first light emitting module 20, the second light emitting module 40, the second light receiving module 50, and the first light receiving module 30. Second, electrical power is applied to the second light emitting module 40 and the second light receiving module 50 through the circuit board 10. In this situation, light beams emitted from the second light emitting module 40 enter into the third converging lens 64 and become parallel, and are reflected about 90 degrees toward the third reflection surface 684 by the second reflection surface 682, and are then reflected about 90 degrees toward the fourth converging lens 65 by the third reflection surface 684, and finally exit from the light incident surface 612 to reach the second light receiving module 50. Third, the optical coupling member 60 is adjusted until the intensity of the light beams received by the second light receiving module 50 falls within a predetermined range. In this situation, the second light emitting module 40 is finely aligned with the third converging lens 64, the second light receiving module 50 is finely aligned with the fourth converging lens 65, thereby the first light emitting module 20 is finely aligned with the first converging lens 62, and the first light receiving module 30 is finely aligned with the second converging lens 63. Fourth, glue is applied to sidewalls of the supports 69 to fix the optical coupling member 60 on the upper surface 14. Thereby, the photoelectric conversion device 100 has a high alignment precision and a high transmission efficiency of light.

Figure 4:
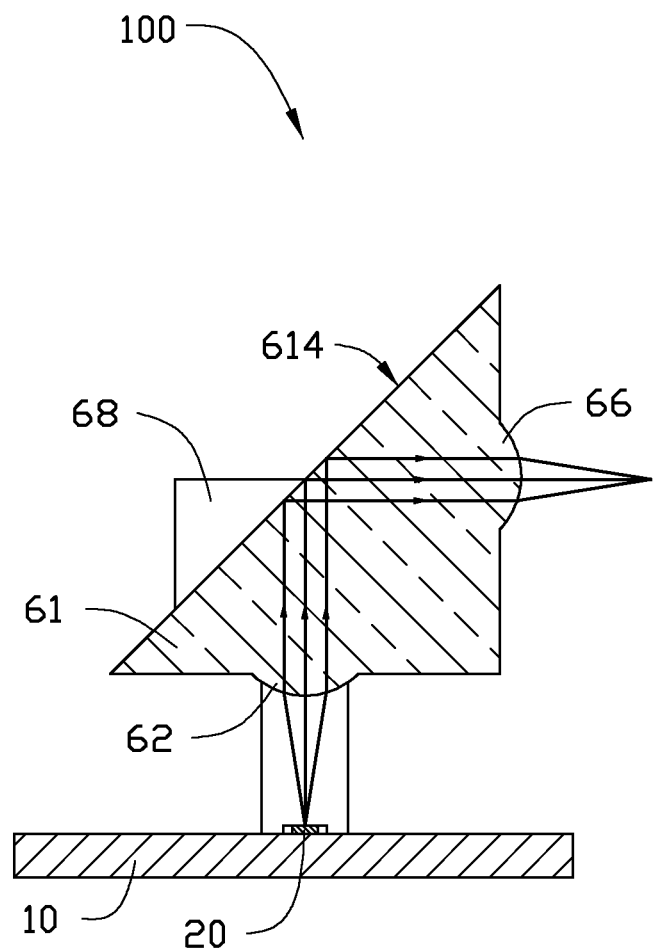
FIG. 4 is a sectional view of the photoelectric conversion device of FIG. 2, taken along the line IV-IV of FIG. 2.

Referring to FIGS. 3-4, when in use, electrical power is applied to the first light emitting module 20 and the first light receiving module 30 through the circuit board 10, thus light beams emitted from the first light emitting module 20 enter into the first converging lens 62 and become parallel, and are then reflected about 90 degrees toward the fifth converging lens 66 by the first reflection surface 614, and are finally converged into an external optical fiber (not shown) by the fifth converging lens 66. Accordingly, parallel light beams passing through the sixth converging lens 67 are reflected about 90 degrees toward the second converging lens 63 by the first reflection surface 614, and are finally converged into the first light receiving module 30 by the second converging lens 63.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A photoelectric conversion device comprising:
   a circuit board comprising an upper surface and a lower surface opposite to the upper surface;
   a first light emitting module;
   a first light receiving module;
   a second light emitting module;
   a second light receiving module, the first and second light emitting modules and the first and second light receiving modules mounted on the upper surface and being apart from each other; and
   an optical coupling member comprising a light incident surface facing toward the first and second light emitting modules and the first and second light receiving modules, a first reflection surface connected to the light incident surface, a first converging lens, a second converging lens, a third converging lens, a fourth converging lens, a second reflection surface, and a third reflection surface, the first, second, third and fourth converging lenses formed on the light incident surface and being apart from each other, the optical coupling member defining a recess in the first reflection surface, the second and third reflection surfaces arranged in the recess and perpendicularly connected to each other, the first converging lens optically coupled to the first light emitting module and configured to direct light from the first light emitting module to the first reflection surface, the second converging lens optically coupled to the first light receiving module and configured to direct light reflected by the first reflection surface to the first light receiving module, the third converging lens optically coupled to the second light emitting module and configured to direct light from the second light emitting module to the second reflection surface, the second reflection surface configured to reflect the light from the third converging lens to the third reflection surface, the fourth converging lens optically coupled to second light receiving module and configured to direct the light from the third reflection surface to the second light receiving module.

2. The photoelectric conversion device as claimed in claim 1, wherein the optical coupling member further comprises a body portion, a reflection portion, and two supports, the body portion comprises the light incident surface, the first reflection surface, and a light output surface, the light incident surface is perpendicular to the light output surface, the first reflection surface is interconnected between the light incident surface and the light output surface, the supports extends from the light incident surface and are arranged apart from each other, and the supports are fixed on the upper surface.

3. The photoelectric conversion device as claimed in claim 2, wherein an included angle between the reflection surface and the light output surface is about 45 degrees, and an included angle between the reflection surface and the light incident surface is about 45 degrees.

4. The photoelectric conversion device as claimed in claim 2, wherein the recess comprises a bottom surface, the bottom surface is parallel to the upper surface and the light incident surface, and the second reflection surface and the third reflection surface are connected to the bottom surface.

5. The photoelectric conversion device as claimed in claim 4, wherein the optical coupling member is adhered to the upper surface with adhesive.

6. The photoelectric conversion device as claimed in claim 5, wherein the first light emitting module, the second light emitting module, the second light receiving module, and the first light receiving module, are arranged in line, and the first light emitting module, the second light emitting module, the second light receiving module, and the first light receiving module are located between the supports.

7. The photoelectric conversion device as claimed in claim 6, wherein the optical coupling member further comprises a fifth converging lens and a sixth converging lens both formed on the light output surface and apart from each other, the first reflection surface is configured for reflecting light passing through the first converging lens toward the fifth converging lens, and reflecting light passing through the sixth converging lens toward the second converging lens.

8. The photoelectric conversion device as claimed in claim 7, wherein the first light emitting module, the second light emitting module, the first light receiving module, and the second light receiving module are electrically connected to the circuit board.

\* \* \* \* \*